Oct. 10, 1944.  J. V. JENNINGS  2,360,137
MICROMATIC PRECISION TOOL HOLDER
Filed July 31, 1942  2 Sheets-Sheet 1

INVENTOR
JAMES V. JENNINGS
BY
Jones & Roe
ATTORNEYS

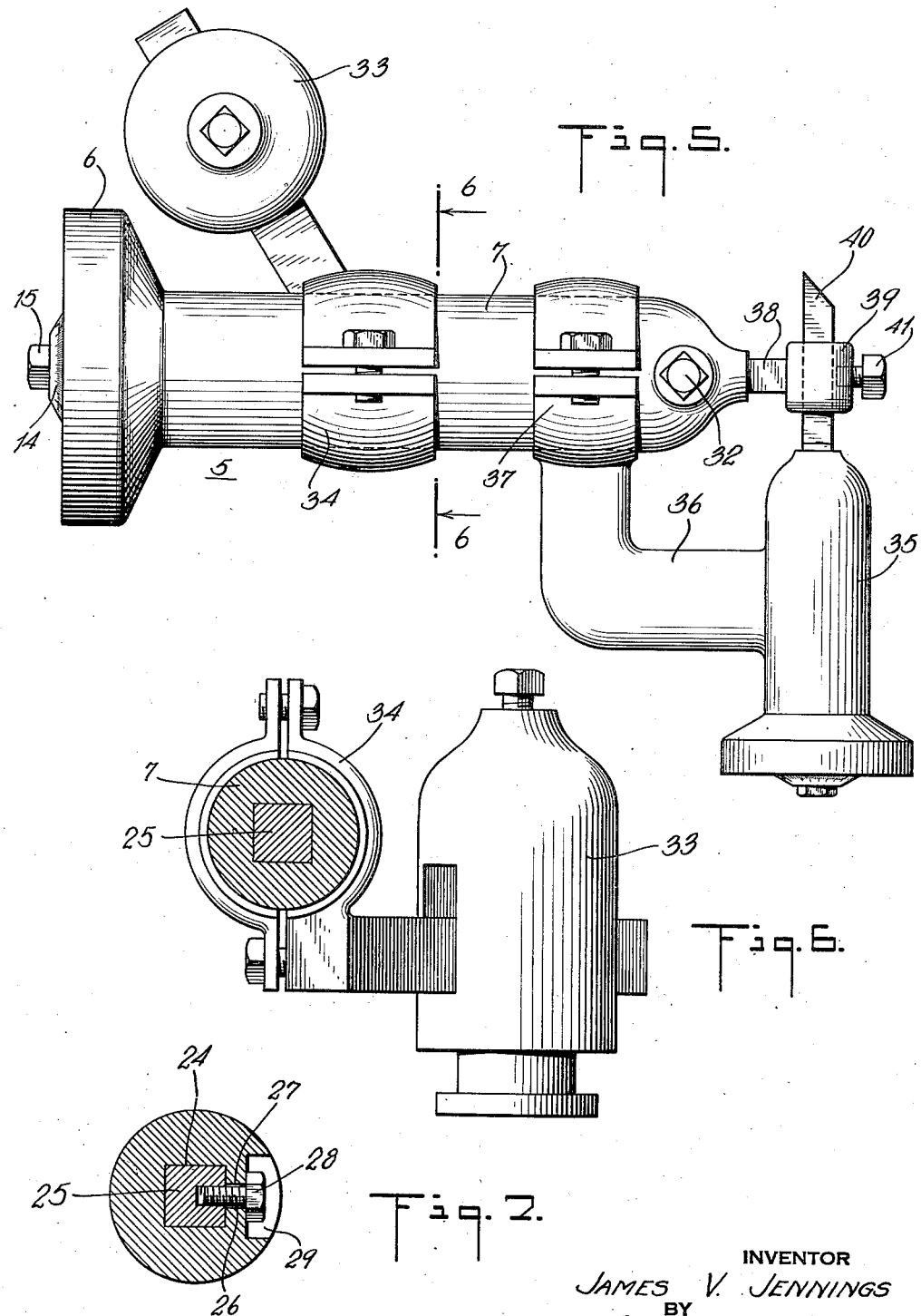

Patented Oct. 10, 1944

2,360,137

UNITED STATES PATENT OFFICE 2,360,137

MICROMATIC PRECISION TOOL HOLDER

James V. Jennings, Yonkers, N. Y.

Application July 31, 1942, Serial No. 453,070

12 Claims. (Cl. 29—96)

My invention relates to micromatic precision tools, and contemplates the provision of a device of this character in which ingenious adaptation of a hypocycloidal train constitutes a virtual vernier, through the medium of which exceptionally minute bit adjustments can be achieved; and the provision of novel means for preventing the transmission of vibrations from the work to the finely machined components which make for the desired fractional measurements, at the same time allowing for simplicity, ruggedness and economy in construction.

To the accomplishment of the recited objects and others coordinate therewith, one embodiment of my invention resides in the construction and arrangement of parts hereinafter described, illustrated in the accompanying drawings and embodied in the scope of the appended claims.

In said drawings:

Fig. 5 is a top plan view of a tool holder illustrating the adaption of a modified form of the invention, Fig. 6 is a transverse section at lines 6—6 of Fig. 5, and Fig. 7 is a cross sectional view along lines 7—7 of Fig. 2.

Figure 1:
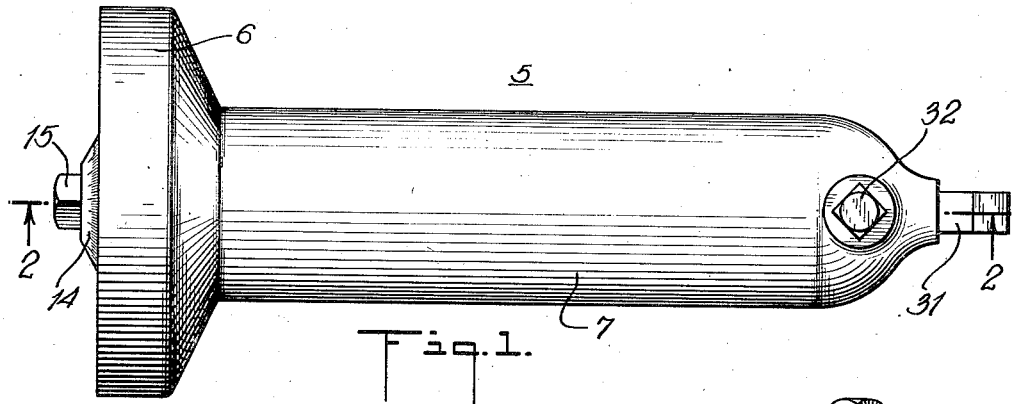
Fig. 1 is a top plan view of a tool holder embodying my invention.

Referring more particularly to the drawings and with specific relation to the invention as devised for accurately determining depth measurements, 5 designates generally the tool holder, comprising a circular head 6 and a cylindrical shank 7. The head is provided, in its face, with a recess 8 adapted to house a fixed ring 9, and certain components which constitute a hypocycloidal train, to wit: a rotatable annulus or base 10, having internal teeth 11 and an eccentrically mounted generating pinion 12 meshing therewith. In this connection, as will be presently explained, it is of the utmost importance that the train, in its entirety, be totally devoid of any lost motion or back lash.

Pinion 12 is carried by the inner extremity of a shaft 13, which extends rearwardly a short distance, and at this point has rigidly secured thereto a dial 14, and a lock nut 15. The teeth of the annulus and the pinion are geared in any suitable ratio to permit of micrometric measurements—four to one, for example—and the faces of the annulus and dial are very delicately graduated at 16 and 17, respectively, commensurate with the determined ratio.

Mechanical structural refinements, as anti-friction bearings 18, to insure ease of operation, and the provision of an inwardly projecting flange 19 from the rear side of the annulus to preclude longitudinal thrust of the pinion and its shaft, are incorporated as parts of the assembly.

Figure 2:
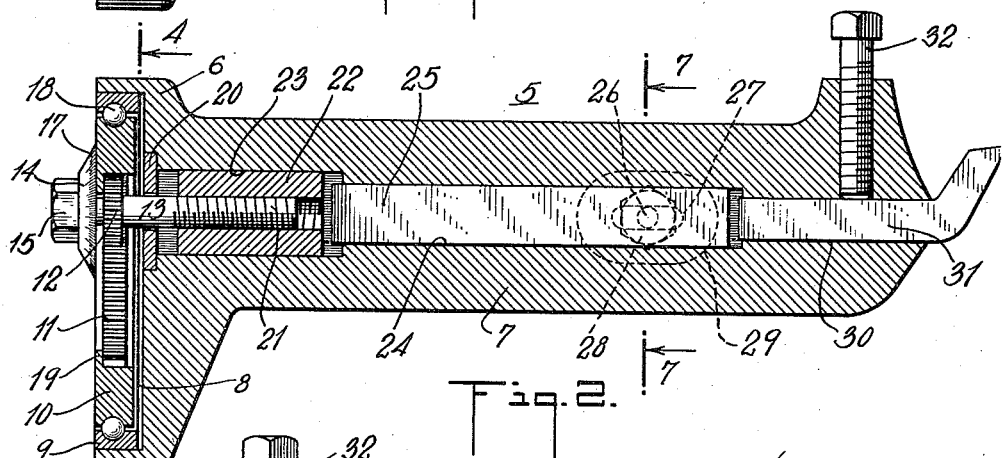
Fig. 2 is a longitudinal section along lines 2—2 of Fig. 1.
Figure 3:
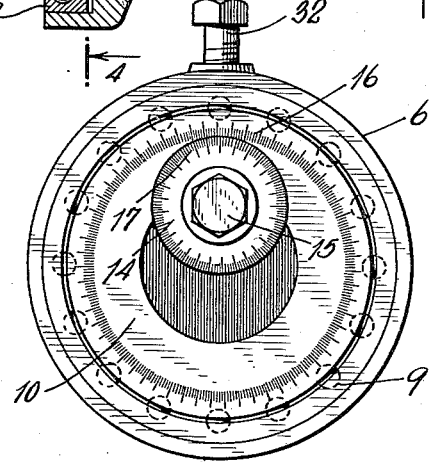
Fig. 3 is a rear end elevation of the holder.
Figure 4:
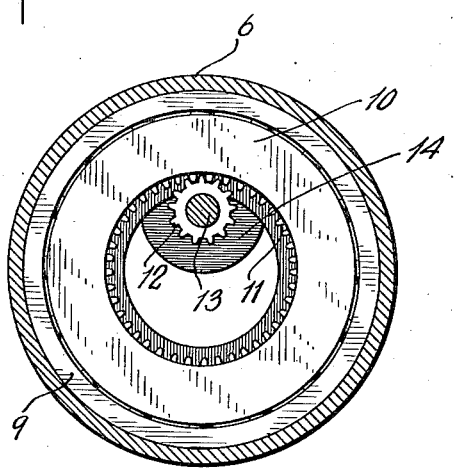
Fig. 4 is a transverse section along lines 4—4 of Fig. 2.

Shaft 13 extends forwardly through the perforated disc 20, and has its extremity 21 threaded for engagement with the correspondingly threaded sleeve 22, which is designed to slide in the medial longitudinal bore 23 of shank 7. Another passage 24, although somewhat reduced in size and having a rectangular cross section, is disposed concentrically with respect to bore 23 and serves to accommodate slide bar 25. As best seen in Figs. 2 and 7, passage 24 terminates short of the front end of the shank, and the bar is equipped with a laterally projecting bolt 26, operating in slot 27. Preferably, the head 28 of the bolt is countersunk in recess 29 of the shank to minimize the possibility of the bolt from becoming loose when once set.

Still another passage 30, in line with passage 24 and extending clear through the forward extremity of the shank, serves to sustain tool 31 when bolt 32 is screwed home. For the sake of clarity, bore 23, and passages 24 and 30 may be considered as one passage.

With the work at hand, bolts 26 and 32 are loosened. Having in mind the depth for which the tool 31 is to be set—and allowing for tolerance—dial 14 is rotated so as to bring the graduated scale of the annulus in precise registration with the measurement desired—this obtains even up to one ten thousandth part of an inch. Manifestly, the threads of shaft 13 and sleeve 22, are machined to a very fine degree of accuracy corresponding to the graduated scales on the dial and the annulus, which latter virtually comprise a vernier. Assuming sleeve 22 to be advanced, the outer end thereof will contact bar 25, thereby constraining it forwardly to a commensurate degree, whereupon the inner end of the tool 31 is adjusted flush with the outer end of the bar. Then bolt 32 is tightened to hold the tool in its set position, and subsequently bar 25 is backed up with regard to tool 31 and bolt 26 screwed home to avoid direct transmission of any vibrations—resulting from the action of the tool on the work—to the delicate mechanism carried by the rear extremity of the tool holder. The retracted position of the bar is illustrated by dotted lines in Fig. 2. Should the fractional adjustment require a retraction of sleeve 22, obviously bar 25 will be slid rearwardly, as will be appreciated by those skilled in the art. And the elimination of vibration may be carried still further by seeing to it that the rear end of bar 25 and the front end of sleeve 22 do not contact, that is, of course, after the tool has been set. Appropriate manipulation of the dial will accomplish this result.

When occasion dictates that measurements both as to depth and diameter be secured, resort is had to a slightly modified form of the invention, in which, as exhibited in Figs. 5 and 6, the depth tool holder 5 is fastened to the tool post 33 by clamp 34 and in turn a second tool holder 35—substantially identical in principle to holder 5—but having an angular bracket 36 and clamp 37, is mounted in proximity to the forward end of holder 5 so as to occupy a position at right angles to the latter. In this instance, shank 7 carries at its outer terminal a bar 38, in lieu of the conventional tool 31, upon which is mounted a sleeve 39, supporting tool 40. Bolt 41 is employed to obtain the desired adjustment of the tool.

It will be understood that my invention has a wide field of adaptability, as it may be employed in connection with turning, boring, facing, drilling, milling, and various other kindred operations; also that the hypocycloidal train and its components may be utilized as a micrometer for outside, inside, depth, lateral or thickness measurements up to the finest fractional parts of an inch.

In its broader aspects the invention comprehends the employment not only of the means described, but of equivalent means for performing the recited functions. It is desired to reserve the right to effect such changes as may come fairly within the scope of the appended claims.

I claim:

1. A tool holder comprising, in combination, a head, a shank, a hypocycloidal train mounted in said head, the shank having a passage therethrough containing, in longitudinal alignment, a slidable bar, a bar-actuator, and a tool, the generating pinion of said train carrying a dial, graduated scales on the dial and base member of the train, and means for converting rotary motion of the pinion into reciprocating motion of the bar-actuator.

2. A tool holder comprising, in combination, a head, a shank, a hypocycloidal train mounted in said head, the shank having a passage therethrough containing a sleeve, a slidable bar, and a tool, means for locking the bar with respect to the shank, the generating pinion of said train carrying a dial, graduated scales on the dial and base member of the train, and means for converting rotary motion of the pinion into reciprocating motion of the sleeve.

3. A tool holder comprising, in combination, a head, a shank, a hypocycloidal train mounted in said head, the shank having a passage therethrough containing a sleeve, a slidable bar, and a tool, the adjacent ends of the bar and tool adapted to contact when the latter is set and to be disconnected thereafter, the generating pinion of said train carrying a dial, graduated scales on the dial and base member of the train, and means for converting rotary motion of the pinion into reciprocating motion of the sleeve.

4. A tool holder comprising, in combination, a head, a shank, a hypocycloidal train mounted in said head, the shank having a passage therethrough containing a sleeve, a slidable bar, and a tool, adjacent ends of the bar and the tool meeting during the operation of setting the tool, and opposite ends of the bar being spaced from the tool and the sleeve subsequent to the adjustment of the tool, the generating pinion of said train carrying a dial, graduated scales on the dial and base member of the train, and means for converting rotary motion of the pinion into reciprocating motion of the sleeve.

5. A tool holder comprising, in combination, a head, a shank, a hypocycloidal train mounted in said head, the shank having a passage therethrough containing a sleeve, a slidable bar having a lateral extension, and a tool, said shank further having a slot to receive the lateral extension, means for anchoring the extension with relation to the shank, the generating pinion of said train carrying a dial, graduated scales on the dial and base member of the train, and means for converting rotary motion of the pinion into reciprocating motion of the sleeve.

6. A tool holder comprising, in combination, a head, a shank, a hypocycloidal train mounted in said head, the shank having a passage therethrough containing an internally threaded sleeve, a slidable bar, and a tool, and a threaded shaft carried by the generating pinion of said train and engageable with the sleeve for advancing said bar against the tool.

7. A tool holder comprising, in combination, a head, a shank, said head having incorporated therein an annulus provided with internal teeth, the shank having a longitudinal passage therein, a shaft disposed eccentrically in the head and extending into the rear portion of said passage, a pinion carried by one extremity of the shaft and engageable with the annulus, a threaded sleeve in the passage, the shaft having complemental threads cooperating therewith, a slidable bar positioned in the passage in advance of the sleeve, a tool in the forward extremity of the passage, the annulus having a graduated scale on its outer face and a dial on the outer end of the shaft.

8. A tool holder comprising, in combination, a head, a shank, a hypocycloidal train mounted in said head, the shank having a passage therethrough containing a bar-actuator, a tool, and a slidable bar between the bar-actuator and the tool, the generating pinion of said train carrying a dial, graduated scales on the dial and base member of the train, and means for converting rotary motion of the pinion into reciprocating motion of the bar-actuator.

9. A tool holder comprising, in combination, a head, a shank, a hypocycloidal train mounted in said head, the shank having a passage therethrough containing in longitudinal alignment, a slidable bar and a bar-actuator, the generating pinion of said train carrying a dial, graduated scales on the dial and base member of the train, and means for converting rotary motion of the pinion into reciprocating motion of the bar-actuator.

10. A tool holder comprising, in combination, a head, a shank, a hypocycloidal train mounted in said head, the shank having a passage therethrough containing in longitudinal alignment, a non-rotatable slidable bar and a bar-actuator, the generating pinion of said train carrying a dial, graduated scales on the dial and base member of the train, and means for converting rotary motion of the pinion into reciprocating motion of the bar-actuator.

11. A tool holder including a vernier micrometric device, a slidable bar, a shaft movable upon operation of said device, a sleeve carried by the shaft designed to actuate said bar, and a tool shank, the confronting ends of the bar and the tool shank adapted to contact when the tool is set and to be separated thereafter prior to feeding the tool on the work at hand.

12. A tool holder including a vernier micrometric device, a slidable bar, a shaft movable upon operation of said device, a sleeve carried by the shaft designed to actuate said bar, and a tool shank, the confronting ends of the bar and the tool shank adapted to contact when the tool is set and to be separated thereafter prior to feeding the tool on the work at hand and means for locking the bar in said separated position.

JAMES V. JENNINGS.